United States Patent [19]
Calvert et al.

[11] 4,093,063
[45] June 6, 1978

[54] ARTICLE HANDLING MEANS FOR A PACKAGING MACHINE

[75] Inventors: Rodney K. Calvert, Dunwoody; Dale K. Scott, Jonesboro, both of Ga.

[73] Assignee: The Mead Corporation, Dayton, Ohio

[21] Appl. No.: 778,624

[22] Filed: Mar. 17, 1977

Related U.S. Application Data

[62] Division of Ser. No. 650,805, Jan. 20, 1976, Pat. No. 4,023,328.

[51] Int. Cl.² .............................................. B65G 47/26
[52] U.S. Cl. .................................... 198/425; 198/696; 198/726
[58] Field of Search ............... 198/419, 425, 459, 460, 198/726, 732, 479, 653, 696, 461; 53/48, 159; 214/1 BA

[56] References Cited

U.S. PATENT DOCUMENTS 2,998,685  9/1961  Ganz ......................................... 53/48
3,190,434  6/1965  Dardaine ................................... 53/48
3,417,540  12/1968 Copping et al. ........................... 53/48
3,812,955  5/1974  Kopp ........................................ 198/732

Primary Examiner—Evon C. Blunk
Assistant Examiner—Joseph E. Valenza
Attorney, Agent, or Firm—Walter M. Rodgers; Walter A. Rodgers

[57] ABSTRACT

Articles to be packaged are fed through a packaging machine on conveyor means and are arranged in groups which are controlled by suitable spacer elements movably mounted on an endless feed element and each including an article engaging pusher projection for imparting movement to a group of preceding articles together with an article engaging restraining projection movable into the path of movement of the articles so as to restrain the movement of the immediately succeeding group thereby to control and precisely to determine the position of the group of articles in order to insure cooperative and synchronous cooperation with other machine operations.

2 Claims, 4 Drawing Figures

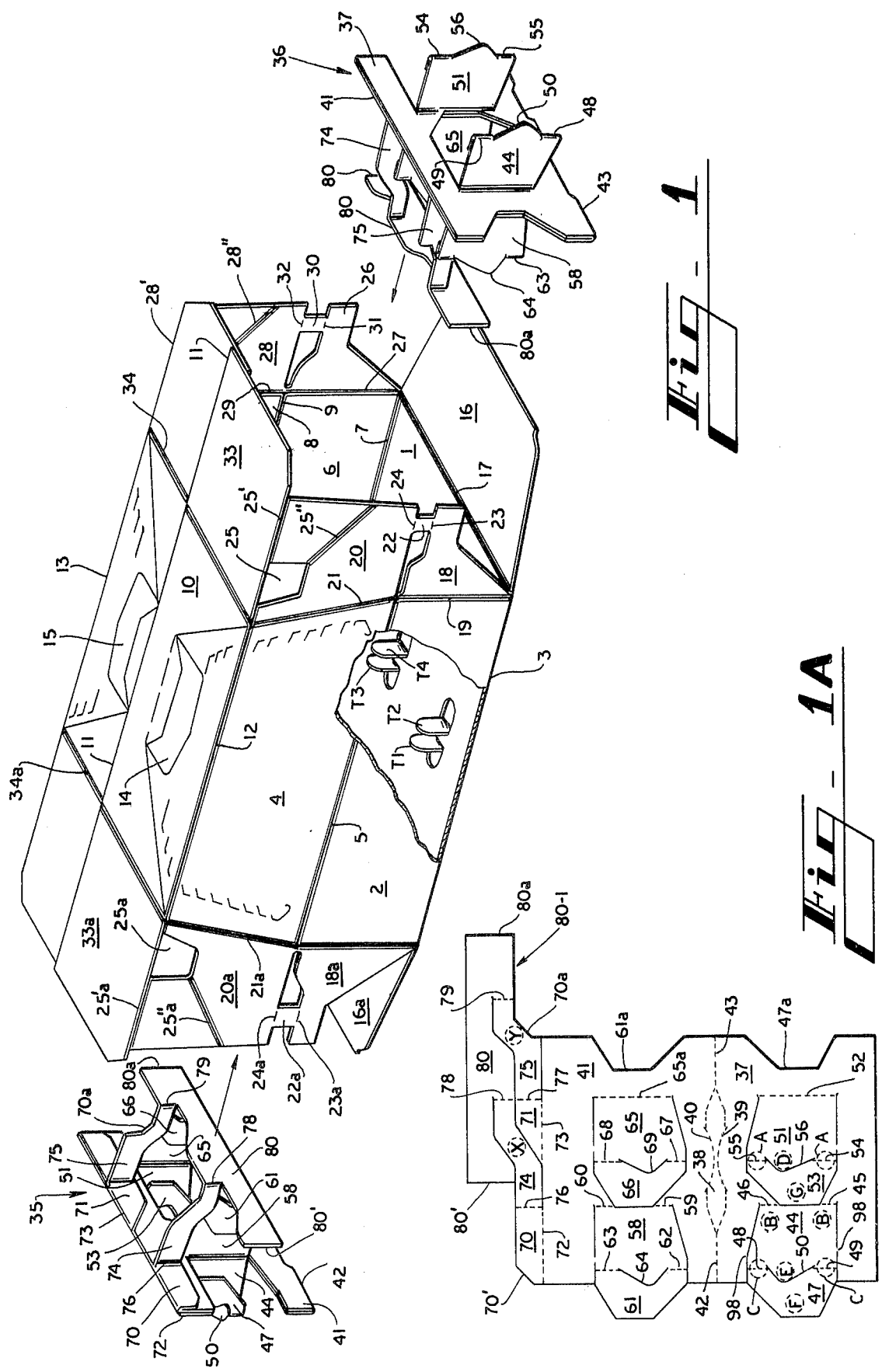

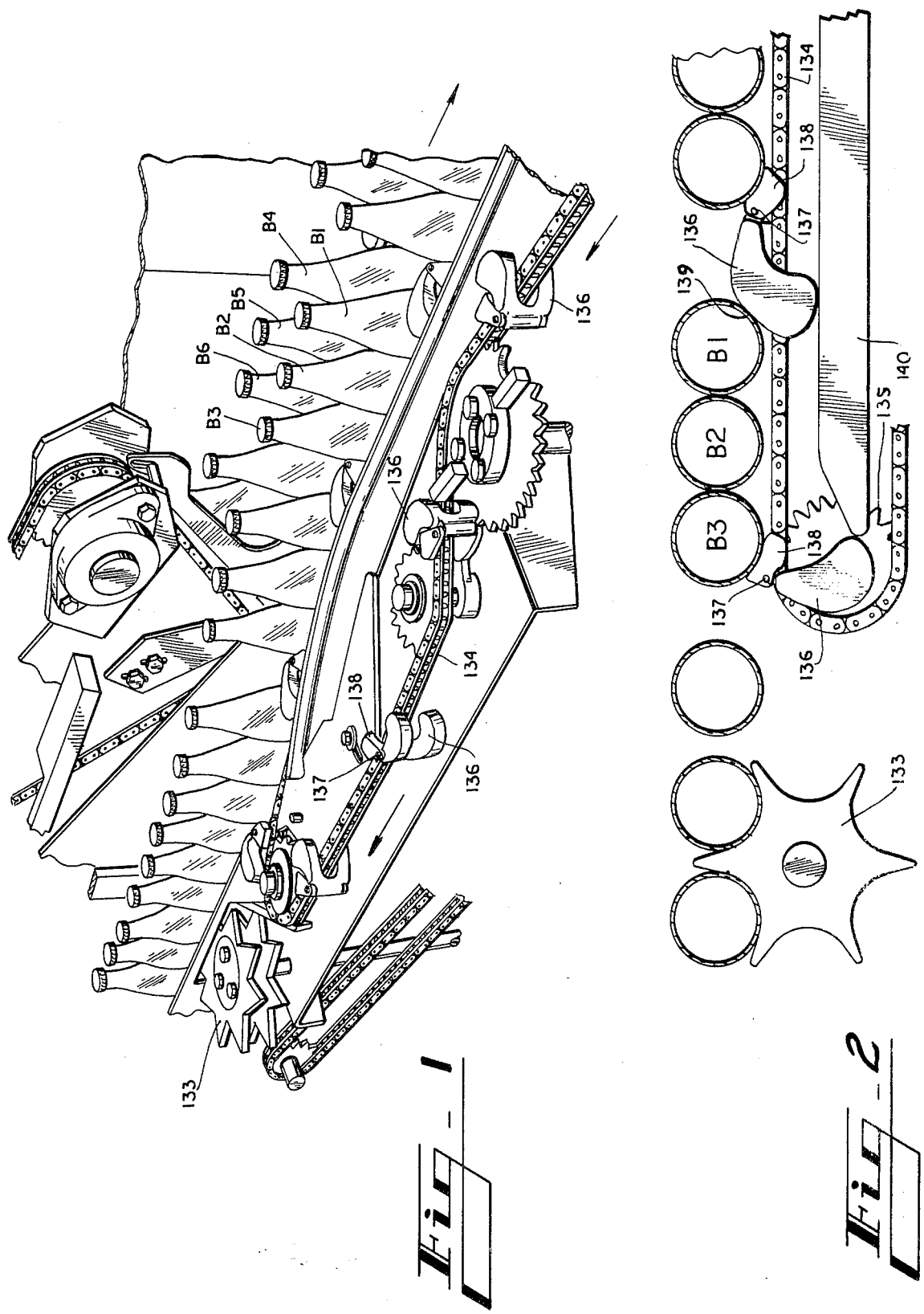

ARTICLE HANDLING MEANS FOR A PACKAGING MACHINE

This is a division of application Ser. No. 650,805 filed Jan. 20, 1976 now U.S. Pat. No. 4,023,328.

U.S. Pat. No. 3,904,036 issued Sept. 9, 1975, and owned by the assignee of this invention discloses and claims a bottle container which is totally enclosed and which is specially adapted for use in conjunction with primary packages such as bottles having tapered neck portions.

U.S. patent application Ser. No. 632,226 filed Nov. 17, 1975, now U.S. Pat. No. 4,007,830 owned by the assignee of this invention discloses and claims an insert which is specially adapted for use in conjunction with the container of the aforementioned U.S. Pat. No. 3,904,036 and which is arranged for insertion from each of the open ends of the container. The two inserts are arranged so as to provide a double thickness separation between all adjacent bottles disposed within the container. The inserts are moved downwardly into cooperative engagement about a group of articles disposed at each of the open ends of the carton and thereafter each group of articles together with its associated insert is moved inwardly through an open end of the bottle container and when disposed in loaded positions, the end flaps of the open ended container are closed to complete the formation and loading of the container.

According to the present invention and in order precisely to position and control a group of bottles moving along a conveyor, suitable spacer elements are movably mounted on an endless feed element and are provided with article engaging pusher projections and article engaging restraining projections manipulated by spacer control means in such manner as to control the forward movement of a group of articles thereby to insure synchronous, timed positioning thereof so as to insure proper cooperation and registry of a set-up insert with its associated group of articles.

For a better understanding of the invention reference may be had to the following detailed description taken in conjunction with the accompanying drawings in which FIG. 1 is a perspective view of the outfeed end of a machine incorporating the invention and which discloses bottles to which inserts are to be applied and which also shows feed control means by which movement and control of the bottles is effected and in which FIG. 2 is an enlarged fragmentary view of a portion of the machine shown in FIG. 1 and by which control of the bottles is effected.

It is necessary precisely to control the position and movement of a group of bottles such as are designated B1, B2 and B3 in FIG. 2. Toward this end, a starwheel such as in indicated at 133 controls the rate of infeed of a group of bottles to a position where the insert is moved into a bottle group. In addition an endless element 134 rotatable about a sprocket 135 and an associated sprocket not shown in FIG. 11 includes a plurality of spacer elements designated by the numeral 136. These spacer elements are pivotally mounted to endless chain 134 as indicated at 137. Each spacer element includes an article engaging pusher projection designated by the numeral 138 which moves into a position as indicated in FIG. 2 immediately behind a bottle such as B3. This engagement enables the pusher element such as 138 to impart movement toward the right to a group of articles designated B1, B2, and B3. In order to prevent articles from advancing toward the right ahead of article engaging pusher projection 138, an article engaging restraining projection 139 is formed on each spacer element and includes a part which engages spacer control means 140 in such manner as to swing its associated spacer element in a clockwise direction about its pivot 137 as viewed in FIG. 2. This action causes the article restraining projection 139 of spacer element 136 to move in front of a bottle such as B1. By this means the position of a group of bottles such as B1, B2 and B3 is fixed relative to the endless feed element 134. Movement of this element 134 is synchronized with movement of pusher lugs and their associated chain which advance the bottles to starwheel 133 as well as with the movement of other parts so as to insure precise and synchronized coordination of the various machine components with the associated bottle group such as B1, B2 and B3.

The embodiments of the invention in which an exclusive property or privilege is claimed are defined as follows:

1. Article handling means for arranging continuously moving articles in spaced groups, said article handling means comprising conveyor means including metering means for continuously moving a row of articles along a predetermined path at a controlled and substantially constant velocity, an endless feed element having a working reach movable alongside said path, a plurality of article engaging pusher projections mounted in a spaced relation on said endless element and arranged respectively to move behind the rearmost article of a group of moving articles to impart movement to such group of articles in the direction of movement of the articles in such manner as to establish a gradually increasing space between such rearmost article and an immediately succeeding continuously moving article, a plurality of elongated smoothly contoured spacer elements pivotally mounted at one end thereof with said pusher projections and each spacer element having an article engaging restraining portion thereon, and spacer control means for sequentially engaging and imparting controlled swinging movement to said spacer elements relative to said endless feed element so as to swing the restraining portions thereof into the path of movement of the articles and into said spaces respectively only after the length thereof is sufficiently great to receive and portions thereby to grip a group of articles between each of said restraining portions and each of the immediately succeeding pusher projections respectively.

2. A machine according to claim 1 wherein said spacer control means comprises a fixed cam disposed for successive engagement by a part of the restraining portion of each of said spacer elements.

* * * * *